INFRARED ABSORPTION SPECTRUM

MALCOLM E. BERGY
HERMAN HOEKSEMA
LEROY E. JOHNSON
DONALD G. KINCH
INVENTORS

ATTORNEY

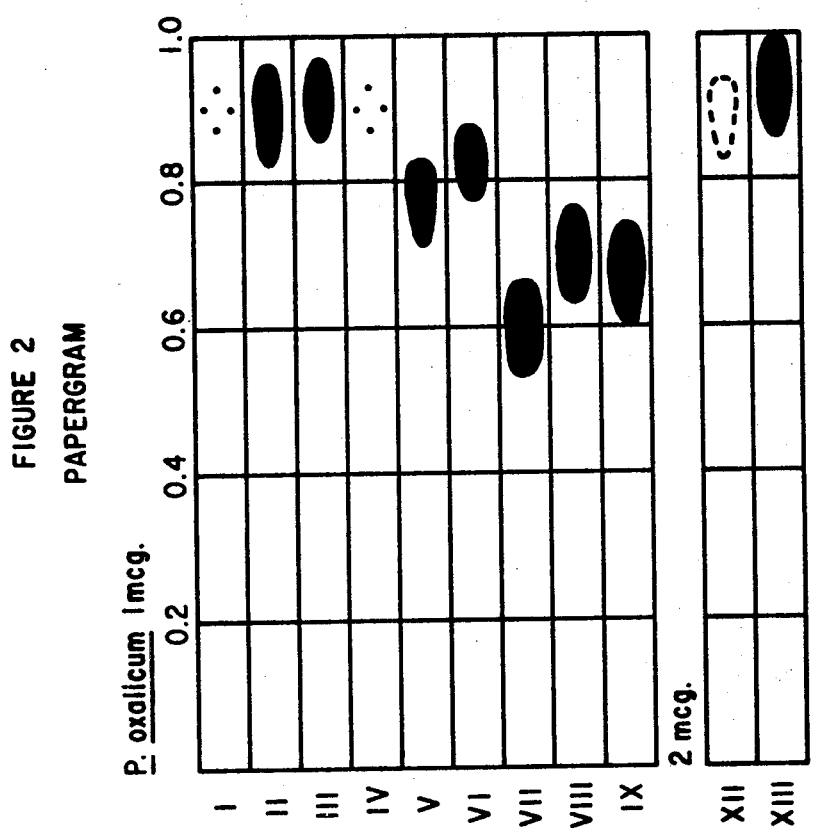

3,651,219
ANTIBIOTIC INGRAMYCIN AND PROCESS FOR PREPARING THE SAME
Malcolm E. Bergy, Kalamazoo, Herman Hoeksema, Cooper, and Le Roy E. Johnson and Donald G. Kinch, Kalamazoo, Mich., assignors to The Upjohn Company, Kalamazoo, Mich.
Filed Sept. 27, 1968, Ser. No. 763,158
Int. Cl. A61k 21/00
U.S. Cl. 424—122    7 Claims

ABSTRACT OF THE DISCLOSURE

Antibiotic ingramycin is producible by culturing *Streptomyces maizeus* sp. nov. in an aqueous nutrient medium. Ingramycin inhibits the growth of *Staphylococcus aureus* and can be used as a disinfectant on washed and stacked food utensils contaminated with this bacterium.

BRIEF SUMMARY OF THE INVENTION

Figure 1:
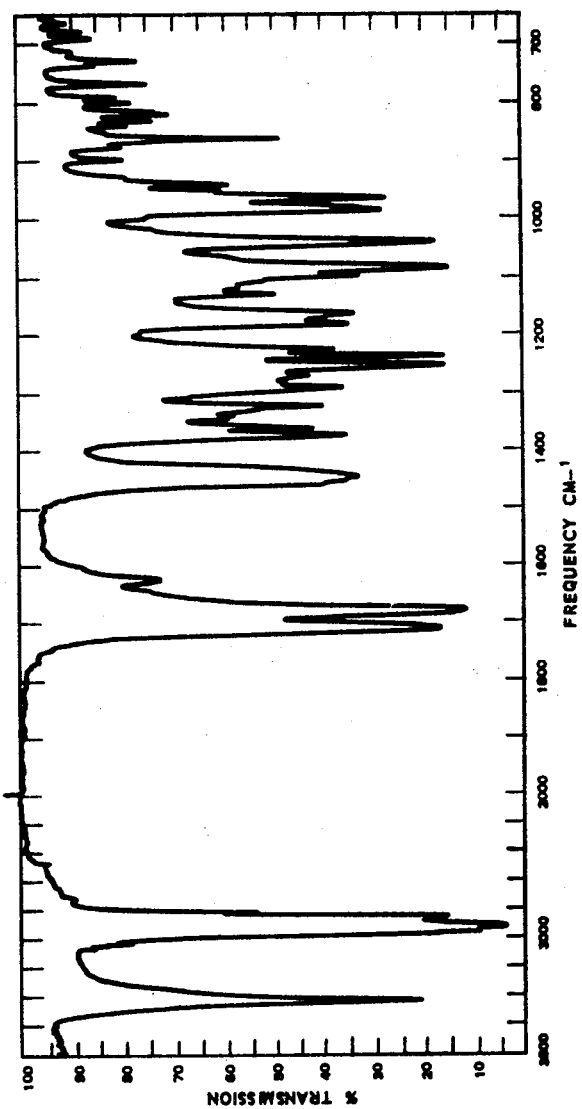

Ingramycin (U–28,010) is a chemical compound which is producible by culturing an ingramycin-producing actinomycete in an aqueous nutrient medium. It is a neutral compound which has the property of adversely affecting the growth of Gram-positive and Gram-negative bacteria, for example, *Staphylococcus aureus* and *Proteus vulgaris*. Ingramycin also has antifungal activity against various fungi, for example, *Blastomyces dermatitidis* and *Histoplasma capsulatum*. Accordingly, ingramycin can be used alone or in combination with other antibiotic agents to prevent the growth of or reduce the number of bacteria and fungi, as disclosed above, in various environments. For example, it is useful for suppressing the fungal growth of sensitive organisms in plate assays and other biological media. Ingramycin also can be used as a feed supplement to promote the growth of animals, for example, mammals, birds, fish, and reptiles.

CHEMICAL AND PHYSICAL PROPERTIES OF INGRAMYCIN

Crystalline ingramycin has the following chemical and physical properties:
Color: White.
Elemental analysis.—Calculated for $C_{18}H_{28}O_4$ (percent): C, 70.10; H, 9.15; O, 20.75. Found (percent): C, 70.01; H, 9.21; O, 20.02.
Molecular weight: 308.1991.
Melting point: 79–81° C.
Solubilities: Ingramycin is soluble in lower-alkanols, e.g., methanol, ethanol, isopropanol, the butanols, and the like; chlorinated lower-alkanes, e.g., methylene chloride, chloroform, ethylene dichloride, and the like; lower-alkanones, e.g., acetone, methyl ethyl ketone, and the like. Ingramycin is relatively insoluble in water.
Optical rotation: $[\alpha]_D^{25}$ —110° (c., 1% in $CHCl_3$).
U.V. spectrum: End absorption with slight shoulder at 221 m$\mu$, $$E_{1\,cm.}^{1\%} = 299.7 \ (\epsilon = 9{,}250)$$

Infrared spectrum: The infrared absorption spectrum of ingramycin suspended in mineral oil mull is reproduced in FIG. 1 of the drawing.
Ingramycin shows peaks at the following wave lengths expressed in reciprocal centimeters:

| | | | |
|---|---|---|---|
| 3430 (S) | | 1088 (S) | |
| 2945 (S) | (oil) | 1070 (M) | (sh.) |
| 2920 (S) | (oil) | 1045 (S) | |
| 2845 (S) | (oil) | 1025 (W) | (sh.) |
| 2815 (M) | (oil) | 1000 (W) | (sh.) |
| 1714 (S) | | 989 (S) | |
| 1681 (S) | | 985 (S) | (sh.) |
| 1627 (W) | | 980 (S) | (sh.) |
| 1460 (S) | (sh.) | 967 (S) | |
| 1454 (S) | (oil) | 955 (M) | |
| 1447 (S) | | 945 (M) | |
| 1375 (S) | (oil) | 933 (W) | |
| 1363 (M) | | 901 (W) | |
| 1345 (M) | | 880 (W) | |
| 1340 (M) | | 865 (M) | |
| 1330 (M) | | 841 (W) | |
| 1325 (M) | | 834 (W) | |
| 1292 (S) | | 823 (W) | |
| 1285 (M) | | 818 (W) | |
| 1272 (M) | | 803 (W) | |
| 1255 (S) | | 794 (W) | |
| 1240 (S) | | 771 (W) | |
| 1229 (S) | | 739 (W) | |
| 1185 (S) | | 731 (W) | |
| 1174 (M) | (sh.) | 716 (W) | |
| 1166 (S) | | 694 (W) | |
| 1132 (M) | | 684 (W) | |
| 1120 (M) | | 667 (W) | |
| 1109 (M) | | 632 (W) | |
| 1100 (S) | | | |

The infrared absorption spectrum of ingramycin in a KBr pellet shows peaks at the following wave lengths expressed in reciprocal centimeters:

| | | | |
|---|---|---|---|
| 3430 (S) | | 1324 (M) | |
| 2970 (S) | | 1292 (M) | |
| 2955 (S) | | 1285 (M) | |
| 2920 (S) | | 1272 (M) | |
| 2870 (M) | | 1255 (S) | |
| 2815 (M) | | 1240 (S) | |
| 1712 (S) | | 1228 (M) | |
| 1705 (S) | (sh.) | 1185 (M) | |
| 1682 (S) | | 1166 (M) | |
| 1677 (S) | | 1132 (M) | |
| 1625 (W) | | 1120 (W) | |
| 1460 (W) | (sh.) | 1109 (M) | (sh.) |
| 1452 (M) | (sh.) | 1100 (M) | |
| 1446 (M) | | 1087 (S) | |
| 1375 (M) | | 1070 (W) | (sh.) |
| 1362 (M) | | 1045 (S) | |
| 1345 (W) | | 1020 (W) | (sh.) |
| 1340 (W) | | 1000 (W) | (sh.) |
| 1330 (W) | | 989 (M) | |

| | |
|---|---|
| 980 (M) (sh.) | 822 (W) |
| 967 (S) | 818 (W) |
| 955 (W) | 802 (W) |
| 944 (W) | 793 (W) |
| 933 (W) | 770 (W) |
| 901 (W) | 737 (W) |
| 879 (W) | 730 (W) |
| 864 (M) | 693 (W) |
| 855 (W) | 680 (W) |
| 840 (W) | 665 (W) |
| 833 (W) | |

Band intensities are indicated as "S," "M," and "W," respectively, and are approximated in terms of the backgrounds in the vicinity of the bands. An "S" band is of the same order of intensity as the strongest in the spectrum; "M" bands are between one-third and two-thirds as intense as the strongest band, and "W" bands are less than one-third as intense as the strongest band. These estimates are made on the basis of a percent transmission scale.

Papergram: The paper chromatographic pattern of ingramycin in the following solvent systems is as shown in FIG. 2 of the drawing:

(I) 1-butanol, water (84:16), 16 hrs.
(II) 1-butanol, water (84:16)+0.25% p-toluene-sulfonic acid, 16 hrs.
(III) 1-butanol, acetic acid, water (2:1:1), 16 hrs.
(IV) 2% piperidine (v./v.) in 1-butanol, water (84:16), 16 hrs.
(V) 1-butanol, water (4:96), 5 hrs.
(VI) 1-butanol, water (4:96)+0.25% p-toluene-sulfonic acid, 5 hrs.
(VII) Phosphate buffer 0.1 M $KH_2PO_4$, $K_2HPO_4 \cdot 3H_2O$, pH 7.0
(VIII) 0.075 N $NH_4OH$ saturated with methyl isobutyl ketone
(IX) Benzene, methanol, $H_2O$ (1:1:2)
(XII) 1-butanol saturated with $H_2O$ plus 2.0% p-toluene-sulfonic acid.
(XIII) Methanol, 15% NaCl (4:1) (strips impregnated beforehand and dried with 0.1 M $Na_2SO_4$).

Antifungal activity: Ingramycin inhibits the growth of *Nocardia asteroides, Blastomyces dermatitidis, Coccidioides immitis, Hormodendrum compactum, Phialophora verrucosa, Histoplasma capsulatum, Monosporium apiospermum, Trichophyton interdigitale, Trichophyton violaceum, Trichophyton mentagrophytes, Microsporum canis,* and *Trichophyton asteroides* on an agar dilution assay. The test compound is incorporated in agar which is then added to petri dishes at concentrations of 1, 10, 100, and 1000 mcg./ml. Suspensions of the test fungi are streak on the agar surface. After incubation for 72 hours at 28° C., the petri dishes are examined and the degree of inhibition of growth observed.

Antibacterial activity: Ingramycin is highly active against *Staphylococcus aureus* in vitro. It inhibits this bacteria at a concentration of 1 mcg./ml. in a standard Brain Heart Infusion broth test. Ingramycin also has marginal activity against *Proteus vulgaris, Klebsiella pneumoniae, Salmonella schottmuelleri, Pseudomonas aeruginosa, Bacillus subtillis, Diplococcus pneumoniae,* and *Saccharomyces pastorianus.*

THE MICROORGANISM

The actinomycete used according to this invention for the production of ingramycin is *Streptomycles maizeus* sp. nov. One of its strain characteristics is the production of ingramycin. A subculture of the living organisms was deposited without restriction and can be obtained from the permanent collection of the Northern Utilization and Research Division, Agricultural Research Service, U.S. Department of Agriculture, Peoria, Ill., U.S.A. Its accession number in this repository is NRRL 3508.

The microorganism of this invention was studied and characterized by Alma Dietz of the Upjohn Research Laboratories.

*Streptomyces maizeus* sp. n.—The materials and methods used in characterizing this culture were those cited in the following references:

Dietz, A.,"*Streptomyces steffisburgensis* Sp. N.", J. Bacteriol. 94: 2022–2026, 1967.
Shirling, E. B., and D. Gottlieb, "Methods for Characterization of Streptomyces Species," Intern. J. System. Bacteriol, 16: 313–340, 1966.

DESCRIPTION

Color characteristics.—Gray aerial mycelium. Melanin-positive. Appearance on Ektachrome is given in Table 1. Reference color characteristics on agar media are given in Table 2. The culture may be placed in the Gray (GY) and Red (R) color series of Tresner and Backus (Appl. Microbiol. 11: 335–338, 1963).

Microscopic characteristics.—Smooth phalangiform spores borne on short spiral sporophores resembling ears of corn with occasional straightening of sporophores to give rectus flexibilis (RF) appearance. Sporophore type is in the sense of Pridham (Appl. Microbiol. 6: 52–79, 1958).

Cultural and biochemical characteristics.—See Table 3.

Carbon utilization.—The ability of the culture to grow on carbon compounds was determined in the synthetic medium of Pridham and Gottlieb (J. Bacteriol. 56: 107–114, 1948) and in their medium as modified by Shirling and Gottlieb (Intern. J. System Bacteriol. 16: 313–340, 1966). In the former growth was good on D-xylose, L-arabinose, D-fructose, D-galactose, D-glucose, D-mannose, maltose, lactose, cellobiose, raffinose, dextrin, soluble starch, glycerol, D-mannitol, sodium acetate, sodium citrate, and sodium succinate; moderate on inositol; slight on the control, rhamnose, sucrose, inulin, dulcitol, D-sorbitol, salicin, sodium formate, sodium oxalate, and sodium tartrate. There was no growth on phenol, cresol, or sodium salicylate. In the latter there was no growth on the plain control and good growth on the glucose control. Growth was better than on the glucose control on L-arabinose, D-xylose, inositol, D-mannitol, and D-fructose; somewhat less than with glucose on raffinose and doubtful on sucrose, rhamnose, and cellulose.

Temperature.—Good growth with sporulation occurred at 18–37° C. There was fair vegetative growth in less than 24 hours at 55° C. The optimum temperature is 28° C.

The characteristics of *Streptomyces maizeus* sp. nov., NRRL 3508, are given in the tables following.

TABLE 1
[Appearance of *Streptomyces maizeus* on Ektachrome]

| Agar medium | Surface | Reverse |
|---|---|---|
| Bennett's | Gray-white | Yellow-tan. |
| Czapek's sucrose | Gray-brown | Gray-brown. |
| Maltose-tryptone | Gray-white | Gray-brown. |
| Peptone-iron | No surface growth | Brown. |
| 0.1% tyrosine | Brown | Do. |
| Casein-starch | Gray-brown | Brown-tan. |

TABLE 2

[Reference color characteristics of *Streptomyces maizeus*]

| Agar medium | E Jacobson, W. C. Granville and C. E. Foss, Color Harmony Manual, 3rd Ed., Container Corp. of America, 1948 | K. L. Kelly and D. B. Judd, The ISCC–NBS method of designating colors and a dictionary of color names, U.S. Dept. of Comm. Circ. 553, 1955 |
|---|---|---|
| Bennett's: | | |
| S | 2ih dark covert gray | 112m light olive gray. |
| R | 2pi mustard brown | 113g olive gray; 95gm moderate olive brown. |
| P | 21e(g) mustard old gold | 88gm dark yellow; 94g light olive brown. |
| Czapek's sucrose: | | |
| S | 3ie camel maple sugar tan | 76m light yellowish brown; 77g moderate yellowish brown. |
| Maltose-tryptone: | | |
| S | 2fe covert gray | 94g light olive brown. |
| R | 21g mustard old gold | 112gm light olive gray; 94m light olive brown; 106m light olive. |
| P | 3ie(g) camel maple sugar tan | 107g moderate olive; 76m light yellowish brown; 77g moderate yellowish brown. |
| Yeast extract-malt extract (ISP-2): | | |
| S | 2ih(g) dark covert gray | 112m light olive gray; 113g olive gray. |
| R | 3ie(g) camel maple sugar tan | 76m light yellowish brown; 77g moderate yellowish brown. |
| IP | 21e(g) mustard old gold | 88gm dark yellow; 94g light olive brown. |
| Oatmeal (ISP-3): | | |
| S | 2ih(g) dark covert gray | 112m light olive gray; 113g olive gray. |
| R | 3ge(g) beige camel | 79m light grayish yellowish brown; 94m light olive brown. |
| P | 2ge(g) covert tan griege | 94m light olive brown; 109gm light grayish olive. |
| Inorganic-salts starch (ISP-4): | | |
| S | 3ig beige brown, mist brown | 80m grayish yellowish brown; 95g moderate olive brown. |
| R | 2ge(g) covert tan griege | 94m light olive brown; 109gm light grayish olive. |
| P | 2ec(g) biscuit ecru oatmeal sand | 90gm grayish yellow. |
| Glycerol-asparagine (ISP-5): | | |
| S | 4lg(g) fawn | 60m light grayish brown. |
| R | 2ge covert tan | 80g grayish yellowish brown. |
| P | 1½ec(g) putty | 90gm grayish yellow; 90gm grayish yellow; 93m yellowish gray. |

S=Surface.   R=reverse.   P=pigment.   (g)=glossy surface (otherwise matte).

TABLE 3

[Cultural characteristics of *Streptomyces maizeus*]

| Medium | Surface | Reverse | Other |
|---|---|---|---|
| Agar media: | | | |
| Peptone-iron | Gray | Brown | Melanin positive. |
| Calcium-malate | White | Colorless | No pigment; malate not solubilized. |
| Glucose-asparagine | White | Yellow | No pigment. |
| Skim milk | Trace white to white | do | Yellow pigment; casein solubilized. |
| Tyrosine | Gray-white | Tan | Tan pigment; tyrosine solubilized around growth. |
| Xanthine | do | Yellow | Yellow pigment; xanthine solubilized. |
| Nutrient starch | do | do | Yellow pigment; starch hydrolyzed. |
| Yeast extract-malt extract | do | do | Pale yellow pigment. |
| Bennett's | Dark gray | Olive | Yellow-tan. |
| Czapek's sucrose | Gray | Gray | No pigment. |
| Maltose-tryptone | Gray-white | Tan-brown | Tan-brown. |
| Peptone-yeast extract-iron (ISP-6) | Very slight trace gray | Brown | Melanin positive. |
| Tyrosine (ISP-7) | Gray-white | Gray-tan | No pigment. |
| Gelatin media: | | | |
| Plain | | | Brown pigment ⅙; yellow-tan pigment ⅙; No liquefaction. |
| Nutrient | | | Brown pigment ⅙; yellow pigment ⅙; No liquefaction. |
| Broth media: | | | |
| Nutrient nitrate | White aerial growth on surface pellicle. | | Tan pigment; flocculent growth at base; nitrate not reduced to nitrite. |
| Synthetic nitrate | do | | Yellow pigment; flocculent growth at base; nitrate reduced to nitrite. |
| Litmus milk | Brown surface ring | | Peptonization pH 7.6. |

TABLE 4

[Comparison of albocycline-producers from literature descriptions

| | S. maizeus | MCRL-0129 S. brunneogriseus | MCRL-0356 S. roseocinereus (roseocitreus) | MCRL-0355 S. roseochromogenes v. albocyclini |
|---|---|---|---|---|
| Color Series | Gray and red | Gray | Red | Red. |
| Morphology: | | | | |
| Sporophores | Short, tight spirals (like ears of corn). | Numerous spirals with 2-5 turns. | Open spirals as side branches on sterile aerial mycelium. | Irregular open spirals at end of long hyphae. |
| Spores | Smooth phalangiform surface ridged with much detail. | Smooth phalangiform | Spiny | Smooth phalangiform. |
| Temperature growth | Good growth at 18–37° C.; Fair growth at 55° C. | Good growth at 27–37° C.; No growth at 45° C. | Good growth at 27–37° C.; No growth at 45° C. | Good growth at 27–37° C.; No growth at 45° C. |
| Characteristics: | | | | |
| Glucose-asparagine agar. | | | | |
| AM | White | 3ge powdery, beige; 2lg slate tan.[1] | 6ge velvety, rose gray with white patches.[1] | 6ge powdery, rose gray.[1] |
| R | Yellow | 3nc amber[1] | 4pg dark luggage tan [1] | 4pg dark luggage tan.[1] |
| SP | None | 3la bright maize [1] | 2ga none to colonial yellow [1] | 2ea none or light wheat |
| Calcium malate agar: | | | | |
| AM | White | Powdery, white | Powdery, white scant | Powdery, white. |
| R | Colorless | Colorless | Colorless | Colorless. |
| SP | None | None | None | None. |
| O | Malate not solubilized | Malate solubilized | Malate not solubilized | Malate not solubilized. |
| Tyrosine agar: | | | | |
| AM | Gray white | Powdery, white scant | Powdery, white scant | Powdery, white. |
| R | Tan | 4pn dark brown | Colorless | 4ig fawn. |
| SP | Tan | 4nl dark brown | None | 3pn dark brown. |
| O | Tyrosine solubilized around growth. | Tyrosine positive | Tyrosine negative | Tyrosine positive. |
| Bennett's agar:[2] | | | | |
| AM | 2ih dark covert gray | 6ge white rose 1½lg olive gray to 3ih beige gray. | 5ig velvety, rose taupe with white patches. | 6ge powdery, rose gray. |
| R | 2pi mustard brown | 4ni chestnut brown | 4lc dusty orange | Colorless. |
| SP | 21e(g) mustard old gold | 3ng yellow maple | None | 3dc natural. |
| Potato plug: | | | | |
| AM | Cream white | 3ba powdery, white later pearl. | 1½na powdery white to bright yellow. | Powdery, white. |
| R | Brown | 3pi golden brown (G) | Colorless (G) | 3pi golden brown (G). |
| SP | do | 6pn dark brown | None | 4pl deep brown. |

See footnotes at end of table.

TABLE—Continued

| | S. maizeus | MCRL-0129 S. brunneogriseus | MCRL-0356 S. roseocinereus (roseocitreus) | MCRL-0355 S. roseochromogenes v. albocyclini |
|---|---|---|---|---|
| Egg medium: | | | | |
| AM | Gray | Powdery, white | 1½na powdery white to bright yellow. | Powdery, white. |
| R | Pale gray | 2lg mustard tan (G) | Colorless | 2lg mustard tan. |
| SP | None | 3pn dark mustard tan | None | 3pn dark brown. |
| Gelatin stab: | | | | |
| AM | do | 3lg powdery beige brown | do | 3ge powdery, beige. |
| SP | Brown to yellow tan | 3nl dark brown | do | 3pn dark brown. |
| O | No liquefaction | Liquefaction | No liquefaction | No liquefaction. |
| Litmus milk: | | | | |
| AM | None | None | None | None. |
| O | Peptonization reaction-basic | Peptonization reaction-acidic | Peptonization reaction-acidic | Peptonization reaction-acidic. |
| Cellulose (agar) | | | | |
| AM | Gray | None | None | None. |
| SP | None | 2ec biscuit | None | Do. |
| Coagulated serum: | | | | |
| AM | do | None | Powdery, white scant | Do. |
| SP | Tan-brown | 3ni clove brown | None | Do. |
| O | No liquefaction | No liquefaction | No liquefaction | No liquefaction. |

¹ Color names according to Color Harmony Manual 4th Ed. 1963, Container Corporation of America.
² Color names according to Color Harmony Manual 3rd Ed. 1948, Container Corporation of America.
(G)=Growth.   (g)=glossy surface.
NOTE.—AM-aerial myceluem, R: reverse, SP: soluble pigment, O: other characteristics.

TABLE 5

[Utilization of carbon compounds by albocycline-producing streptomyces]

| | S. maizeus | S. brunneogriseus | S. roseocinereus (roseocitreus) | S. roseochromogenes v. albocyclini |
|---|---|---|---|---|
| Control | (−) | − | − | − |
| Arabinose | + | + | + | + |
| Dextrin | + | ± | + | + |
| Fructose | + | ++ | + | + |
| Galactose | + | + | + | + |
| Glucose | + | ++ | + | + |
| Glycerol | + | + | + | + |
| Inositol | (+) | − | + | + |
| Lactose | + | + | + | + |
| Maltose | + | ++ | + | + |
| Mannitol | + | + | + | + |
| Mannose | + | + | ++ | ++ |
| Raffinose | + | ++ | + | − |
| Rhamnose | (−) | − | + | − |
| Salicin | (−) | − | + | + |
| Starch | + | + | ++ | ++ |
| Sucrose | (−) | + | + | + |
| Xylose | + | + | + | + |

++=good utilization.   +=moderate utilization.
±=little utilization.   −=no utilization.

*Streptomyces maizeus* was compared in Tables 4 and 5 with other Streptomyces which have been reported in the literature as producing albocycline. (See: Furumai, Tamotsu; Noboru Nagahama and Tomaharu Okuda. 1968. Studies on a new antibiotic, albocycline. (II) Taxonomic studies on albocycline-producing strains. J. of Antibiotics 21: 85–90.) Direct comparison of *S. maizeus* with these other Streptomyces was not possible because these other Streptomyces are not available to the public.

The new compound of the invention is produced when the elaborating organism is grown in an aqueous nutrient medium under submerged aerobic conditions. It is to be understood also that for the preparation of limited amounts surface cultures and bottles can be employed. The organism is grown in a nutrient medium containing a carbon source, for example, an assimilable carbohydrate and a nitrogen source, for example, an assimilable nitrogen compound or proteinaceous material. Preferred carbon sources include glucose, brown sugar, sucrose, glycerol, starch, cornstarch, lactose, dextrin, molasses, and the like. Preferred nitrogen sources include corn steep liquor, yeast, autolyzed brewer's yeast with milk solids, soybean meal, cottonseed meal, cornmeal, milk solids, pancreatic digest of casein, distillers' solubles, animal peptone liquors, meat and bone scraps, and the like. Combinations of these carbon and nitrogen sources can be used advantageously. Trace metals, for example, zinc, magnesium, manganese, cobalt, iron and the like need not be added to the fermentation media since tap water and unpurified ingredients are used as media components.

Production of the compound of the invention can be effected at any temperature conducive to satisfactory growth of the microorganism, for example, between about 18° and 40° C., and preferably between about 20° and 32° C. Ordinarily, optimum production of the compound is obtained in about 2 to 10 days. The medium normally remains weakly acidic (pH 5–6.5) during the fermentation. The final pH is dependent, in part, on the buffers present, if any, and in part on the initial pH of the culture medium which is advantageously adjusted to about pH 7.2 prior to sterilization.

When growth is carried out in large vessels and tanks, it is preferable to use the vegetative form, rather than the spore form, of the microorganism for inoculation to avoid a pronounced lag in the production of the new compound and the attendant inefficient utilization of the equipment. Accordingly, it is desirable to produce a vegetative inoculum in a nutrient broth culture by inoculating this broth culture with an aliquot from a soil or a slant culture. When a young, active vegetative inoculum has thus been secured, it is transferred aseptically to large vessels or tanks. The medium in which the vegetative inoculum is produced can be the same as, or different from, that utilized for the production of the new compound, as long as it is such that a good growth of the microorganism is obtained.

The new compound of the invention is a neutral chemical compound having the formula $C_{18}H_{28}O_4$. It is relatively insoluble in water, and soluble in lower-alkanols, e.g., methanol, ethanol, isopropanol, the butanols, and the like; chlorinated lower-alkanes, e.g., methylene chloride, chloroform, ethylene dichloride, and the like; and the lower-alkanones, e.g., acetone, methyl ethyl ketone, and the like.

A variety of procedures can be employed in the isolation and purification of ingramycin, for example, solvent extraction, silica gel chromatography, liquid-liquid distribution in a Craig apparatus, and crystallization from solvents. Solvent extraction procedures are preferred for commercial recovery, inasmuch as they are less time consuming and less expensive. Crystallization from Skellysolve B (isomeric hexanes) following silica gel chromatography, is a preferred purification procedure.

In a preferred recovery process, ingramycin is recovered from its culture medium by separation of the mycelial and undissolved solids by conventional means such as by filtration or centrifugation. The antibiotic is then removed from the filtered or centrifuged broth by extraction. Some of the antibiotic also can be recovered from the filter cake. For the extraction of ingramycin from the filtered broth, or filter cake, water-immiscible solvents in which it is soluble, for example, Skellysolve B, ethyl acetate, methylene chloride, can be used. Skellysolve B is the preferred extraction solvent. The extract containing the antibiotic can be concentrated in vacuo.

Alternatively, ingramycin can be recovered from the whole beer (without solids separated therefrom) by extraction with a water immiscible solvent such as ethylacetate, methylene chloride, or Skellysolve B, at a pH range of 2–10. The solvent extract can be evaporated to a residue containing ingramycin.

Purification of a concentrated solvent extract or other residue containing antibiotic ingramycin can be accomplished by passing the concentrate, after solution in an organic solvent, for example, a mixture of ethylacetate and water, over a silica gel chromatography column. The column can be eluted with an ethyl acetate-cyclohexane mixture (2:5). The eluate from the chromatography column is evaporated to an oil and the oil again chromatographed over a silica gel column and eluted with the same eluant as above. Fractions from the column are collected and again evaporated to an oil. Upon the addition of Skellysolve B, the oil is induced to crystallize and yield crystalline ingramycin.

Novel acyl derivatives, wherein the acyl group is a hydrocarbon carboxylic acid acyl of from 2 to 6 carbon atoms, inclusive, can be made from the antibiotic ingramycin. Acylation of igramycin is accomplished by reacting this compound with an acid halide or anhydride of a selected hydrocarbon carboxylic acid in the presence of an acid-binding agent, for example, a tertiary amine. Suitable tertiary amines include heterocyclic amines such as pyridine, quinoline, and isoquinoline; trialkylamines such as trimethylamine, triethylamine, triisopropyl amine, and the like; N,N-dialkylanilines such as dimethylaniline, diethylaniline, and the like; and N-alkyl piperidines such as N-ethylpiperidine, N-methylpiperidine, and the like. The preferred base is pyridine.

Carboxylic acids suitable for esterification include (a) saturated or unsaturated, straight or branched chain aliphatic carboxylic acids, for example, acetic, propionic, butyric, isobutyric, valeric, isovaleric, and caproic; (b) saturated or unsaturated, alicyclic carboxylic acids, for example, cyclobutanecarboxylic acid, cyclopentanecarboxylic acid, cyclopentenecarboxylic acid, methylcyclopentenecarboxylic acid, cyclohexanecarboxylic acid, dimethylcyclohexenecarboxylic acid, dipropylcyclohexanecarboxylic acid, and the like; (c) saturated or unsaturated, alicyclic aliphatic carboxylic acids, for example, cyclopentaneacetic acid; (d) aromatic carboxylic acids, for example, benzoic acid, or toluic acid; (e) aromatic-aliphatic carboxylic acids, for example, phenylacetic acid and phenylpropionic acid; or loweralkoxy, for example methoxy, ethoxy, propoxy, butoxy, and isomeric forms thereof.

The acylation is advantageously conducted by treating a solution of the antibiotic ingramycin in a tertiary amine with an acid halide or anhydride and heating the resulting mixture, if necessary, for a short period at about 80–100° C. to complete the reaction. The reaction mixture can then be evaporated in vacuo to a crystalline residue which can be washed with water, dried and chromatographed on a silica gel column which can be developed with ethyl acetate:cyclohexane (3:5 v./v.).

The new compound of the invention, ingramycin, and its acylates, can be used as disinfectants on various dental and medical equipment contaminated with *Staphylococcus aureus*; also they can be used as disinfectants on washed and stacked food utensils contaminated with *Staphylococcus aureus*. The novel compounds of the invention also can be used as the antifungal agent in the shoe uppers disclosed in U.S. Pat. 3,130,505. Further, the novel compounds of the invention can be used to swab laboratory benches and equipment in a mycological laboratory.

The following examples are illustrative of the process and products of the present invention, but are not to be construed as limiting. All percentages are by weight and all solvent mixture proportions are by volume unless otherwise noted.

EXAMPLE 1

(A) *Fermentation*

A soil stock of *Streptomyces maizeus* sp. nov., NRRL 3508, is used to inoculate a series of 500-ml. Erlenmeyer flasks, each containing 100 ml. of sterile, preseed medium consisting of the following ingredients:

|  | G./liter |
|---|---|
| Glucose monohydrate | 25 |
| Pharmamedia [1] | 25 |
| Tap water q.s. | Balance |

[1] Pharmaedia is an industrial grade of cottonseed flour produced by Trader's Oil Mill Company, Fort Worth, Tex.

The flasks are grown for 3 days at 28° C. on a rotary shaker.

One shake flask (100 ml.) of the preseed inoculum, described above, is used to inoculate a 20-liter tank containing 13 liters of sterile seed medium consisting of the same ingredients as used above in the preseed medium.

The seed tank is grown for 2 days at a temperature of 28° C., with aeration at a rate of 10 standard liters per minute and agitation at a rate of 400 r.p.m.

The seed tank, described above, is used to inoculate a 400-liter fermentor containing 250 liters of the following sterile medium:

|  | G./liter |
|---|---|
| Glucose monohydrate | 10 |
| Glycerol | 10 |
| Cottonseed meal | 10 |
| Tap water | Balance |

Before sterilization of the medium, the pH of the medium is adjusted to 7.2 with a 50% aqueous solution of sodium hydroxide. The fermentation cycle is 3 days during which time the temperature is controlled at 28° C., filtered air is supplied at a rate of 200 standard liters per minute, and agitation at the rate of 300 r.p.m. Ucon defoamer (supplied by Union Carbide Corporation) is added to control foaming. A representative ingramycin fermentation assays about 32 BU/ml. at 48 hrs. against the microorganism *Penicillium oxalicum*. The assay is conducted as follows:

A unit volume (0.08 ml.) of solution containing the material to be assayed is placed on a 12.7 mm. assay disc which is then placed on an agar plate seeded with the assay microorganism. A biounit (BU) is defined as the concentration of the antibiotic which gives a 20 mm. zone of inhibition under the standard assay conditions. Thus, if for example a fermentation beer has to be diluted 1/100 to give the 20 mm. zone of inhibition, the potency of such beer is 100 BU/ml.

(B) *Extraction*

Whole beer (500 l. assaying 18.5 BU/ml. of ingramycin against *P. oxalicum*) is filtered using diatomaceous earth as a filter aid. The filter cake is extracted 5 times with acetone (total 80 liters, assaying 24 BU/ml. against *P. oxalicum*) and the extract is concentrated to an aqueous and freeze dried; yield, 542 g. of crude ingramycin. This material is labeled as "A." A material which is labelled as "B," is obtained by extracting the filtered beer with Skellysolve B to obtain 300 l. assaying 20 BU/ml. of Skellysolve B extract. This material is evaporated to dryness; yield, 52 g. of oil assaying 180 BU/mg. of ingramycin against the microorganism *P. oxalicum*.

The crude acetone extract "A" is dissolved in a mixture of 3 liters of ethyl acetate and 3 liters of water. The ethyl acetate is removed and evaporated to 500 ml. This is then diluted with 500 ml. cyclohexane and passed over a 4-inch column containing 1 kg. silica gel (E. Merck Ag. Darmstadt No. 7734, 70–325 mesh ASTM). The column is eluted with ethyl acetate-cyclohexane (1:1) until no more material which decolorized a periodate permanganate mixture (10 g. sodium bicarbonate, 8 g. sodium periodate, 1 g. potassium permanganate in 500 ml. water) can be eluted. The eluate is evaporated to an oil, yield 6.1 g. This oil is chromatographed over 300 g. silica gel in a 1.5 inch column, and eluted with ethyl acetate cyclohexane (2:5). Fractions of 20 ml. each are collected.

Fractions 58–120 are combined and evaporated to an oil. Addition of Skellysolve B to this oil induced crystallization of ingramycin; yield, 1.6 g.

A 3-ml. aliquot of the Skellysolve B extract designated "B," described above, is chromatographed over a 4-inch column containing 4 kg. of silica gel which is developed by the solvent mixture ethyl acetate:cyclohexane (2:5 v./v.). Fractions of 1000 ml. each are collected. Fractions 6–11 are combined and evaporated to an oil. This oil is induced to crystallize by adding Skellysolve B; yield, 6.38 g. of white crystals of ingramycin assaying 97 BU/mg. against the microorganism *P. oxalicum*. The melting point of these crystals is 79–81° C.

EXAMPLE 2.—INGRAMYCIN ACETATE 1.1 g. of ingramycin in 10 ml. pyridine is treated with 1 ml. acetic anhydride and stored at room temperature for 120 hrs. This material is then heated at 80° C. for 6 hrs. and 1 ml. additional acetic anhydride is added. Heating is continued for 8 hrs. The reaction mixture is then evaporated in vacuo to a crystalline residue which is washed with water, dried, and chromatographed on a silica gel column developed with ethyl acetate:cyclohexane (3:5 v./v.). Fractions of 10 ml. each are collected from the column. Fractions numbered 15 through 30 are collected and pooled. These fractions are concentrated in vacuo to a residue. Upon the addition of acetone and water, ingramycin acetate crystallizes; yield, 500 mg. having a melting point of 66–80° C.

*Analysis.*—Calc. for $C_{20}H_{30}O_5$ (percent): C, 68.54; H, 8.63; M.W. 350. Found (percent): C, 67.65; H, 8.51; M.W. 350.2.

Optical rotation: $[\alpha]_D^{25}$ −105 (c., 1% in chloroform).

EXAMPLE 3

By substituting the acetic anhydride in Example 2 by propionyl chloride, isobutyryl chloride, isovaleryl chloride, and hexanoyl chloride, there are obtained the corresponding ingramycin acylates.

The characteristics of ingramycin, described herein, are similar to those reported in the literature for the antibiotic albocycline. [See N. Nagahama et al., The J. of Antibiotics, Ser. A. (Japan), vol. 20, No. 5, pp. 261–266 (1967); and the paper given by M. Suzuki et al. in the 157th Scientific Meeting of J.A.R.A. (Japan Antibiotics Research Association). See also the paper presented by M. Suzuki et al. at the 150th Scientific Meeting of J.A.R.A. concerning the new antibiotic TA-2407, which is apparently albocycline; and the paper by N. Miyairi et al. in J. Antibiotics, Ser. A. (Japan), vol. 19, No. 2, pp. 56–62 wherein there is described the antibiotics cineromycins A and B with cineromycin B possibly being a desmethyl albocycline.] None of these references enable an ordinary person skilled in the art to make albocycline. Further, none of the publications cited above, nor any other known prior publication, enables an ordinary person skilled in the art to make the antibiotic of the subject case. Thus, since none of the publications are "enabling disclosures" they are not valid references under 35 U.S.C. 102. (See the Board of Appeals Decision in Ex parte Alexander D. Argoudelis, 849 O.G. 1237).

We claim:

1. A composition of matter assaying at least 18.5 BU/ml., ingramycin, a compound which
    (a) is effective in inhibiting the growth of various Gram-negative and Gram-positive bacteria, and fungi; and in its essentially pure crystalline form;
    (b) is soluble in methanol, ethanol, isopropanol, the butanols, methylene chloride, chloroform, ethylene dichloride, acetone, methyl ethyl ketone, and ethyl acetate; and is relatively insoluble in water;
    (c) has the following elemental analysis: C, 70.01; H, 9.21; O, 20.02;
    (d) has a molecular weight of 308.1991;
    (e) has a characteristic infrared absorption spectrum as shown in FIG. 1 of the accompanying drawing; and
    (f) has a characteristic papergram pattern as shown in FIG. 2 of the accompanying drawing.
2. The composition of matter of claim 1 in dry form, said composition of matter assaying at least 97 biounits/mg. of ingramycin on the *P. oxalicum* assay.
3. The compound, ingramycin, according to claim 1, in its essentially pure form.
4. The compound, ingramycin, according to claim 1, in its essentially pure crystalline form.
5. A process for making the compound defined in claim 1 which comprises cultivating *Streptomyces maizeus* sp. nov., having the identifying characteristics of NRRL 3508, in an aqueous nutrient medium under aerobic conditions until substantial antibiotic activity is imparted to said medium by the production of ingramycin.
6. A process according to claim 5 which comprises cultivating *Streptomyces maizeus* sp. nov., having the identifying characteristics of NRRL 3508, in an aqueous nutrient medium containing a source of assimilable carbohydrate and assimilable nitrogen under aerobic conditions until substantial antibiotic activity is imparted to said medium by the production of ingramycin and isolating the ingramycin so produced.
7. A process according to claim 6 in which the isolation comprises filtering the medium, extracting the resulting filtrate with a water-immiscible solvent for ingramycin, and recovering ingramycin from the solvent extract.

References Cited

Miyairi et al., J. of Antibiotics, Ser. A, vol. 19, No. 2, March 1966, pp. 56–62.

Nagahama et al., J. of Antibiotics, Ser. A., vol. 20, No. 5, September 1967, pp. 261–266.

JEROME D. GOLDBERG, Primary Examiner

U.S. Cl. X.R.

195—80